(12) United States Patent
Kim et al.

(10) Patent No.: US 8,174,645 B2
(45) Date of Patent: May 8, 2012

(54) ELECTRONIC DISPLAY DEVICE COMPRISING POLARIZING SWITCH AND PATTERN POLARIZER

(75) Inventors: Beom-Shik Kim, Yongin-si (KR); Hui Nam, Yongin-si (KR); Chan-Young Park, Yongin-si (KR); Ja-Seung Ku, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 312 days.

(21) Appl. No.: 12/034,589

(22) Filed: Feb. 20, 2008

(65) Prior Publication Data

US 2008/0259232 A1 Oct. 23, 2008

(30) Foreign Application Priority Data

Apr. 19, 2007 (KR) .................. 10-2007-0038348

(51) Int. Cl.
*G02F 1/1335* (2006.01)
(52) U.S. Cl. .............................. 349/96; 349/15; 349/197
(58) Field of Classification Search .................... 349/15, 349/9, 96, 174, 197, 193, 194
See application file for complete search history.

(56) References Cited

U.S. PATENT DOCUMENTS

| | | | |
|---|---|---|---|
| 6,181,303 B1 * | 1/2001 | Johnson et al. | 345/7 |
| 6,417,895 B1 * | 7/2002 | Tabata et al. | 349/15 |
| 6,590,605 B1 * | 7/2003 | Eichenlaub | 348/51 |
| 6,967,671 B2 * | 11/2005 | Miyagawa | 347/241 |
| 7,339,563 B1 * | 3/2008 | Goyins et al. | 345/87 |
| 7,557,871 B2 * | 7/2009 | Matsumoto et al. | 349/15 |
| 7,609,330 B2 * | 10/2009 | Kim | 349/15 |
| 7,868,952 B2 * | 1/2011 | Fukushima et al. | 349/15 |

FOREIGN PATENT DOCUMENTS

| | | |
|---|---|---|
| JP | 2003-66370 | 3/2003 |
| JP | 2003-337226 | 11/2003 |
| JP | 2003-337390 | 11/2003 |
| KR | 1999-0049331 | 7/1999 |
| KR | 2002-0084301 | 11/2002 |

OTHER PUBLICATIONS

Patent Abstracts of Japan, Publication No. 2003-066370; Date of Publication: Mar. 5, 2003; in the name of Shiki Takabayashi, et al.
Patent Abstracts of Japan, Publication No. 2003-337226; Date of Publication: Nov. 28, 2003; in the name of Richard Robert Mosley, et al.
Patent Abstracts of Japan, Publication No. 2003-337390; Date of Publication: Nov. 28, 2003; in the name of Takasato Taniguchi et al.
Korean Patent Abstracts (for KR Laid-open Publication No. 1999-0049331), Publication No. 100250808 B1; Date of Publication: Jan. 7, 2000; in the name of Yong Beom Lee, et al.
Korean Patent Abstracts, Publication No. 1020020084301 A; Date of Publication: Nov. 5, 2002; in the name of Jin Hui Jung.

* cited by examiner

*Primary Examiner* — Thoi Duong
(74) *Attorney, Agent, or Firm* — Christie, Parker & Hale, LLP

(57) ABSTRACT

An electronic display device including a display unit for displaying an image and a light controller disposed in front of the display unit. The light controller includes a polarizing switch for controlling a polarizing direction using an electrical signal, and a pattern polarizer for controlling light transmission in cooperation with the polarizing switch. The polarizing switch has first and second common electrodes facing each other and a liquid crystal layer located between the first and second common electrodes. The pattern polarizer has a plurality of polarizing portions and a plurality of non-polarizing portions alternately arranged in a first direction.

9 Claims, 11 Drawing Sheets

ELECTRONIC DISPLAY DEVICE COMPRISING POLARIZING SWITCH AND PATTERN POLARIZER

CROSS-REFERENCE TO RELATED APPLICATION

This application claims priority to and the benefit of Korean Patent Application No. 10-2007-0038348 filed in the Korean Intellectual Property Office on Apr. 19, 2007, the entire content of which is incorporated herein by reference.

BACKGROUND OF THE INVENTION

1. Field of the Invention

The present invention relates to an electronic display device. More particularly, the present invention relates to an electronic display device that can selectively realize either a two dimensional planar image or a three dimensional stereoscopic image.

2. Description of the Related Art

Generally, stereoscopic display devices are configured to allow a user to perceive a three dimensional image by providing different images to the user's left and right eyes. Among stereoscopic display devices, an autostereoscopic display device that can allow the user to see the stereoscopic image without wearing equipment such as polarizing glasses has been known.

A typical autostereoscopic display device employs a method where a light-separation element such as a lenticular lens or a parallax barrier is positioned on a front portion of a display unit in order to separate from each other left eye and right eye images that are displayed on the display unit, and direct them toward the user's left and right eyes, respectively. However, the autostereoscopic display device has a drawback in that it can only display a stereoscopic image.

Therefore, in recent years, a liquid crystal (LC) parallax barrier using technologies relating to a liquid crystal display panel has been developed to selectively realize either a two dimensional planar image or a three dimensional stereoscopic image. The LC barrier includes a liquid crystal layer and electrodes that are provided between a pair of substrates, and polarizing plates attached on respective outer surfaces of the substrates. The LC barrier selectively realizes a two dimensional mode when it is in a total transmission state and a three dimensional mode when it is in an optically parallax barrier state.

However, in the conventional LC barrier, since the electrodes are patterned in the form of the parallax barrier, the manufacturing process is complicated. Further, since two glass substrates should be used, it is difficult to make the electronic display device slim. In addition, since a viewing distance (a distance between an electronic display device and a viewer) that allows the viewer to identify the stereoscopic image is relatively long as the left eye and right eye images are separated from each other by a distance between the left and right eyes, it is difficult to apply the liquid crystal barrier to a mobile device.

The viewing distance is proportional to a distance between an image formation plane of the display unit and an image separation plane of the LC barrier, and the image separation plane is generally formed in the LC barrier with reference to the liquid crystal layer. In order to reduce the viewing distance, a distance between the image formation plane and the image separation plane must be reduced. However, in the conventional LC barrier, there is a limitation in reducing the viewing distance due to the thicknesses of the glass substrates and the polarizing plate.

The above information disclosed in this Background section is only for enhancement of understanding of the background of the invention and therefore it may contain information that does not form the prior art that is already known in this country to a person of ordinary skill in the art.

SUMMARY OF THE INVENTION

Various exemplary embodiments of the present invention have been made to provide an electronic display device with a simplified manufacturing process and a reduced thickness by improving a liquid crystal barrier's structure. It also can reduce a viewing distance by reducing a distance between an image formation plane and an image separation plane.

A first embodiment of the present invention provides an electronic display device including a display unit for displaying an image and a light controller in front of the display unit. The light controller has a polarizing switch for controlling a polarizing direction using electrical signals, and a pattern polarizer for controlling light transmission in cooperation with the polarizing switch. The polarizing switch has first and second common electrodes facing each other and a liquid crystal layer between the first and second common electrodes. The pattern polarizer has a plurality of polarizing portions and a plurality of non-polarizing portions alternately arranged in a first direction.

In one example of the first embodiment, the display unit is a liquid crystal display panel. In this case, the liquid crystal display panel includes first and second polarizing plates having respective polarizing axes that are substantially perpendicular to each other. In a further example of this embodiment, the second polarizing plate has a first polarizing axis, the polarizing switch has a second polarizing axis in an off-state and a third polarizing axis in an on-state, and the polarizing portions of the pattern polarizer have a fourth polarizing axis.

The second polarizing axis may be substantially perpendicular to the first polarizing axis or substantially coincide with the first polarizing axis. The fourth polarizing axis may substantially coincide with the second polarizing axis. With this arrangement, the light controller is in a total transmission state when the polarizing switch is in the off-state.

Alternatively, the fourth polarizing axis may be substantially perpendicular to the second polarizing axis. With this arrangement, the light controller is in a partial transmission state when the polarizing switch is in an off-state.

In another example of the first embodiment, the display unit is selected from the group consisting of an organic light emitting display panel, a cathode ray tube, a plasma display panel, and a field emission display panel. In this embodiment, the light controller has a polarizing plate disposed in front of the display unit. In a further example, the polarizing plate has a first polarizing axis, the polarizing switch has a second polarizing axis in an off-state and a third polarizing axis in an on-state, and the polarizing portions of the pattern polarizer have a fourth polarizing axis.

The second polarizing axis may be substantially perpendicular to the first polarizing axis or substantially coincide with the first polarizing axis. The fourth polarizing axis may substantially coincide with or be substantially perpendicular to the second polarizing axis.

The polarizing switch may have a first substrate on which the first common electrode is located and a second substrate on which the second common electrode is located, and the first and second substrates may comprise thin films.

The polarizing switch may be between the display unit and the pattern polarizer. Alternatively, the pattern polarizer may be between the display unit and the polarizing switch. Centers of the polarizing portions and the non-polarizing portions may be arranged in a zigzag pattern in a second direction substantially perpendicular to the first direction.

A second embodiment of the present invention provides an electronic display device including a display unit and a light controller. According to this embodiment, the display unit includes front and rear substrates, a liquid crystal layer between the front and rear substrates, pixel electrodes on an inner surface of the rear substrate, a common electrode and color filters on an inner surface of the front substrate, a first polarizing plate behind the rear substrate, a second polarizing plate in front of the front substrate, and a light source behind the first polarizing plate. The light controller is between the first polarizing plate and the rear substrate. The light controller includes a polarizing switch for controlling a polarizing direction using electrical signals, and a pattern polarizer for controlling a light transmission in cooperation with the polarizing switch. The polarizing switch has first and second common electrodes facing each other, and a liquid crystal layer between the first and second common electrodes. The pattern polarizer has a plurality of polarizing portions and a plurality of non-polarizing portions alternately arranged in a first direction.

In an example of the second embodiment, the first polarizing plate has a first polarizing axis, the polarizing switch has a second polarizing axis in an off-state and a third polarizing axis in an on-state, and the polarizing portions of the pattern polarizer may have a fourth polarizing axis. The second polarizing axis may be substantially perpendicular to the first polarizing axis or substantially coincide with the first polarizing axis. The fourth polarizing axis may substantially coincide with or be substantially perpendicular to the second polarizing axis.

BRIEF DESCRIPTION OF THE DRAWINGS

The accompanying drawings, together with the specification, illustrate exemplary embodiments of the present invention, and, together with the detailed description, serve to explain the principles of the present invention.

DETAILED DESCRIPTION OF EMBODIMENTS

Figure 1:
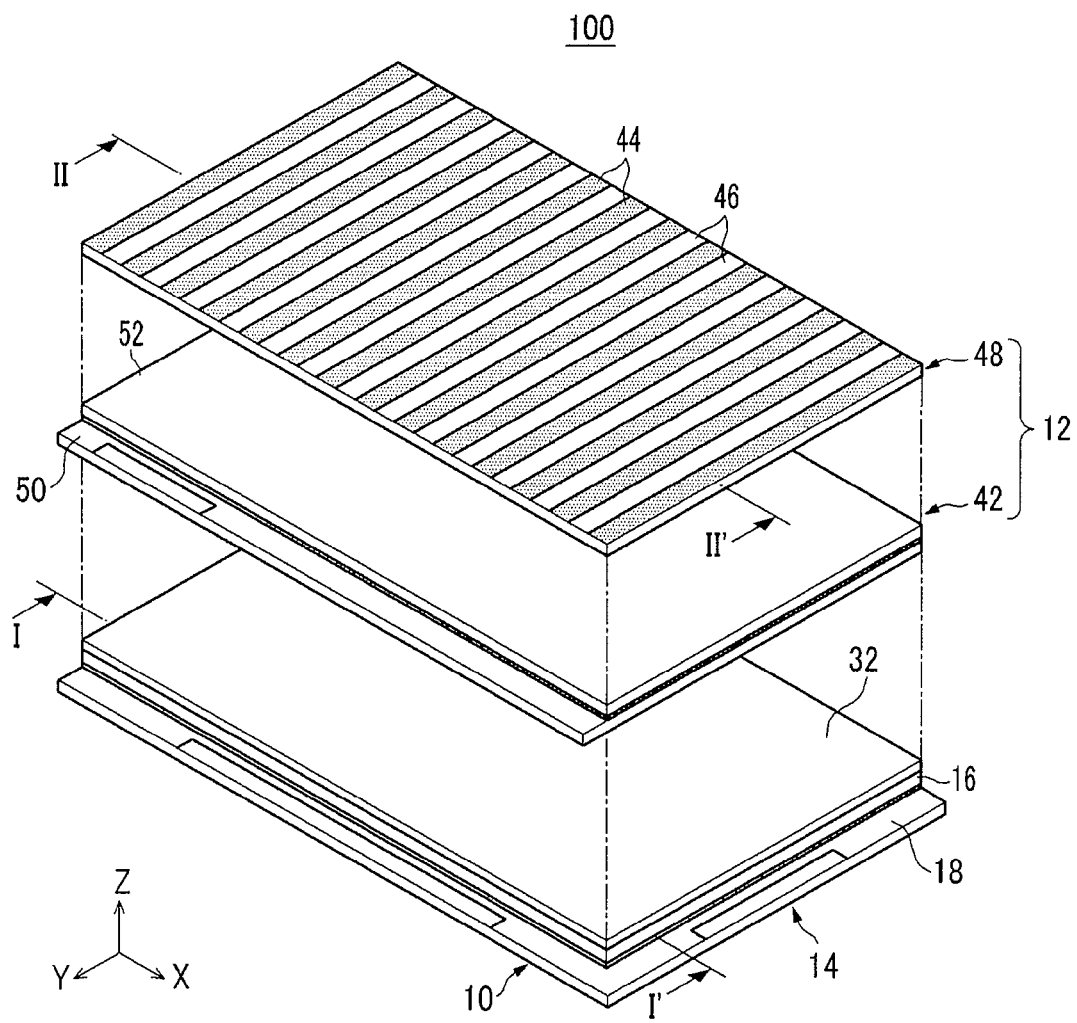
FIG. 1 is an exploded perspective view of an electronic display device according to a first exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Like reference numerals designate like elements throughout the specification.

FIG. 1 is an exploded perspective view of an electronic display device according to a first exemplary embodiment of the present invention.

Referring to FIG. 1, an electronic display device 100 includes a display unit 10 and a light controller 12 located in front of the display unit 10. The display unit 10 includes a plurality of pixels each having red, green, and blue sub-pixels to display a color image.

The display unit 10 may receive a two dimensional image signal and display a two dimensional image. On the other hand, the display unit 10 may receive left eye and right eye image signals by each pixel or each sub-pixel and separately display left and right images. The control of the image signal is performed through an image signal controller (not shown).

Figure 2:
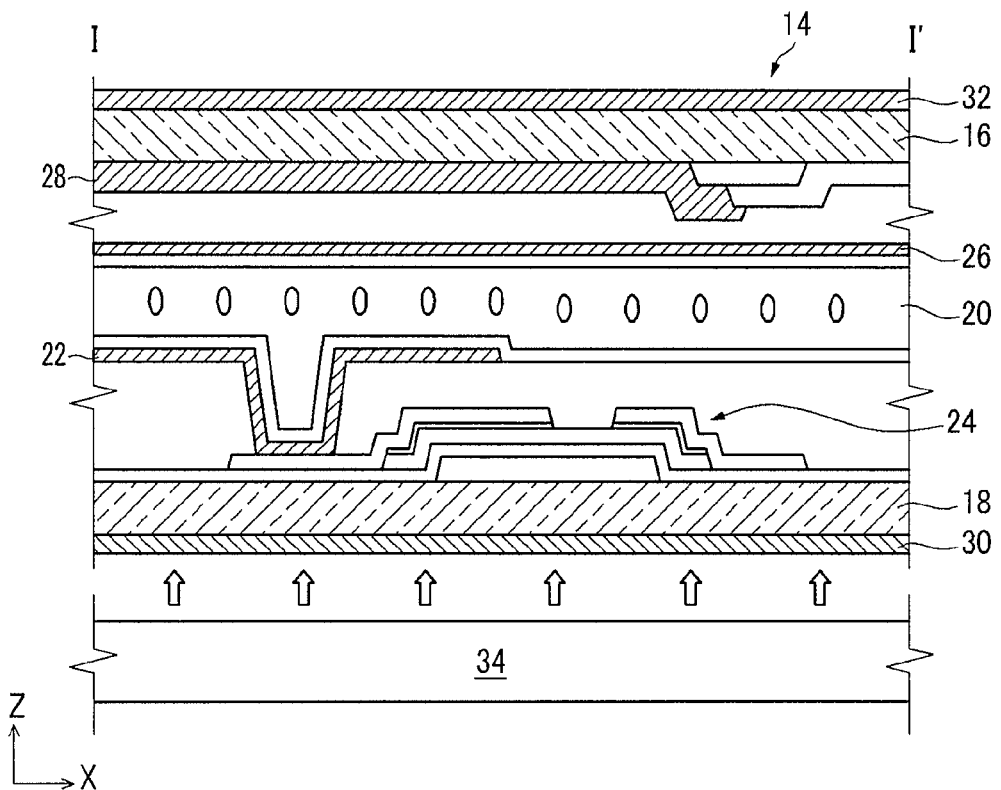
FIG. 2 is a partial sectional view of a display unit of the electronic display device taken along the line I-I' in the x-direction of FIG. 1.

In the present exemplary embodiment, the display unit 10 includes a liquid crystal display (LCD) panel 14 with a cross-section as shown in FIG. 2.

Referring to FIGS. 1 and 2, the LCD panel 14 includes front and rear substrates 16 and 18, a liquid crystal layer 20 disposed between the front and rear substrates 16 and 18, pixel electrodes 22 located on an inner surface of the rear substrate 18, thin film transistors 24 located on the inner surface of the rear substrate 18 to control driving of the pixel electrode 22, a common electrode 26 located on an inner surface of the front substrate 16, color filters 28 located on the inner surface of the front substrate 16 to display a color, a first polarizing plate 30 located on an outer surface of the rear substrate 18, a second polarizing plate 32 located on an outer surface of the front substrate 16, and a light source 34 located at an outer side of the first polarizing plate 30.

The first and second polarizing plates 30 and 32 are arranged such that their polarizing axes are substantially perpendicular to each other. The polarizing axis of one of the first and second polarizing plates 30 and 32 substantially coincides with a horizontal direction (an x-direction in FIG. 2) of a screen and the polarizing axis of the other of the first and second polarizing plates 30 and 32 substantially coincides with a vertical direction (a y-direction in FIG. 2, coming out of the page) of the screen. For example, when the polarizing axis of the first polarizing plate 30 coincides with the vertical direction of the screen, the polarizing axis of the second polarizing plate 32 coincides with the horizontal direction of the screen.

Light emitted from the light source 34 is linearly polarized while passing through the first polarizing plate 30, and the linearly polarized light is directed to the liquid crystal layer 20. When voltages are applied to the respective pixel and common electrodes 22 and 26, an electric field is formed through the liquid crystal layer 20 by a difference between the voltages applied to the respective pixel and common electrodes 22 and 26, and twisting angles of the liquid crystal molecules are thereby varied. Therefore, the light incident on the liquid crystal layer 20 is circular or oval-polarized by the twisted liquid crystal molecules and an amount of the light passing through the second polarizing plate 32 is adjusted in accordance with a degree of the polarization, thereby controlling light transmittance of each pixel.

When the display unit 10 includes the LCD panel 14 as described above, the light controller 12 receives the light that is linearly polarized by the second polarizing plate 32. The light controller 12 selectively realizes either a two dimensional mode where it is in a total transmission state, where substantially all of the light is transmitted, or a three dimensional mode where it is in a partial transmission state, creating an optically parallax barrier by utilizing the polarizing property of the received light and a polarizing function thereof.

Figure 3:
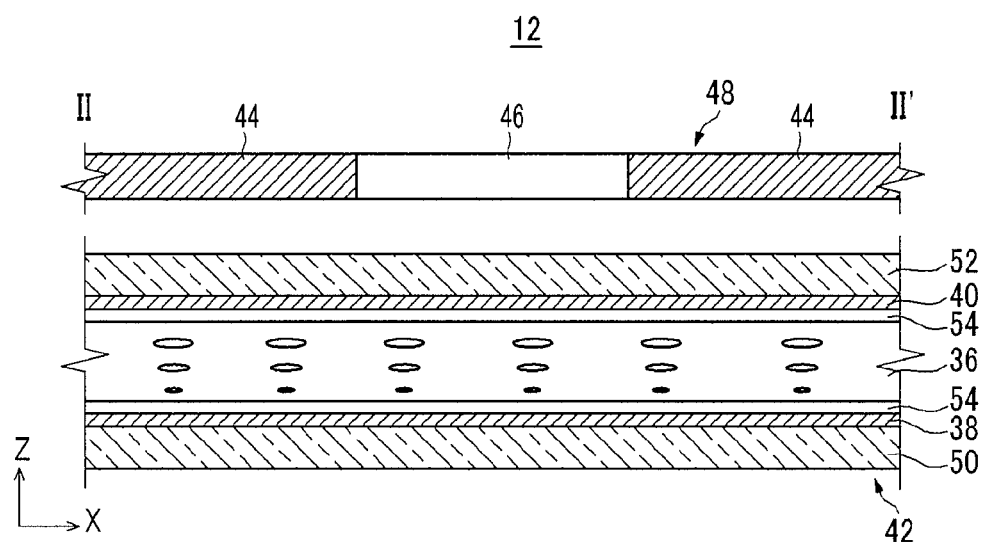
FIG. 3 is a partial sectional view of a light controller of the electronic display device taken along the line II-II' in the x-direction of FIG. 1.

FIG. 3 is a sectional view of the light controller of the electronic display device of FIG. 1.

Referring to FIGS. 1 and 3, the light controller 12 includes a polarizing switch 42 for controlling a polarization direction in accordance with an electrical signal using a liquid crystal layer 36 and a pair of common electrodes 38 and 40, and a pattern polarizer 48 having polarizing and non-polarizing portions 44 and 46 that are alternately arranged along the horizontal direction (the x-axis in the drawings) of the screen.

The polarizing switch 42 includes first and second substrates 50 and 52, the liquid crystal layer 36 disposed between the first and second substrates 50 and 52, a first common electrode 38 located on an inner surface of the first substrate 50, a second common electrode 40 located on an inner surface of the second substrate 52, and a pair of orientation layers 54 that cover the first and second common electrodes 38 and 40, respectively.

The first and second substrates 50 and 52 may be formed of a thin film. The first common electrode 38 is formed on an entire active area of the first substrate 50, and the second common electrode 40 is formed on an entire active area of the second substrate 52.

The polarizing and non-polarizing portions 44 and 46 of the pattern polarizer 48 are arranged in a stripe pattern extending in the vertical direction (the y-direction in the drawings, coming out of the page) of the screen. Each of the polarizing portions 44 has a polarizing axis that is in parallel with the horizontal or vertical direction of the screen, and the non-polarizing portions 46 allows the incident light to pass therethrough while not polarizing the incident light.

The pattern polarizer 48 may be located in the front or rear of the polarizing switch 42. FIGS. 1 and 3 show a case where the pattern polarizer 48 is located in front of the polarizing switch 42 by way of example. In addition, in FIGS. 1 and 3, although the polarizing portions 44 and the non-polarizing portions 46 are formed with identical widths, the present invention is not limited to this configuration. For example, the width of each polarizing portion 44 may be greater than the width of each non-polarizing portion 46.

Figure 4:
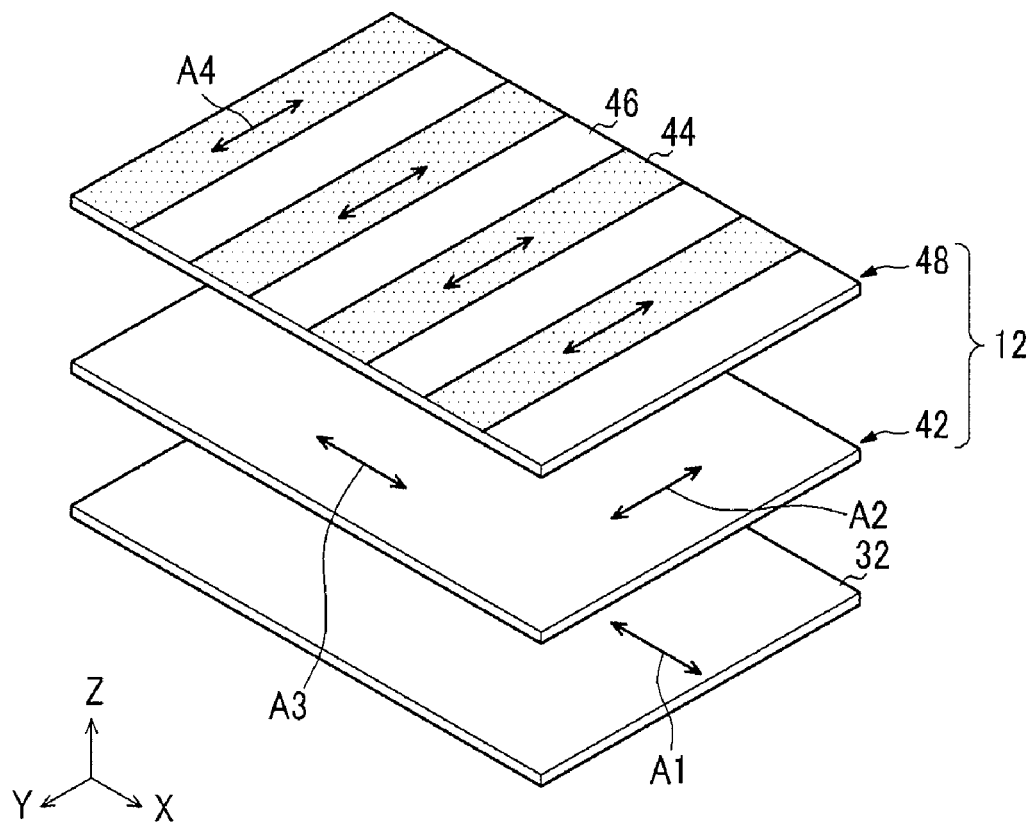
FIGS. 4 and 5 are partial exploded perspective views of a second polarizing plate of a display unit and a light controller of the electronic display device of FIG. 1.

FIG. 4 is a schematic exploded perspective view of the second polarizing plate 32 of the display unit and the light controller 12 of the electronic display device 100 of FIG. 1.

Referring to FIG. 4, the second polarizing plate 32 has a first polarizing axis A1. The polarizing switch 42 includes a second polarizing axis A2 that transmits light in an off-state and a third polarizing axis A3 that transmits light in an on-state. Each of the polarizing portions 44 of the pattern polarizer 48 has a fourth polarizing axis A4.

The first to fourth polarizing axes A1, A2, A3, and A4 substantially coincide with one of the horizontal or vertical directions of the screen (the x-direction or y-direction in the drawings). The on-state of the polarizing switch 42 means that driving voltages that are greater than a threshold value are being respectively applied to the first and second common electrodes 38 and 40.

The polarizing switch 42 may use liquid crystal having a twisting angle of 90° in the on-state or off-state, and be disposed such that the second polarizing axis A2 coincides with or is perpendicular to the first polarizing axis A1. When the second polarizing axis A2 is perpendicular to the first polarizing axis A1, the polarizing switch 42 linearly polarizes the incident light by 90° in the off-state and transmits the incident light in the on-state. When the second polarizing axis A2 coincides with the first polarizing axis A1, the polarizing switch 42 transmits the incident light in the off-state and linearly polarizes the incident light by 90° in the on-state.

FIG. 4 shows a case where the first polarizing axis A1 coincides with the horizontal direction of the screen and the second polarizing axis A2 of the polarizing switch 42 is perpendicular to the first polarizing axis A1.

In the above-described structure, the fourth polarizing axis A4 may coincide with the second polarizing axis A2. In this case, the linearly polarized light along the second polarizing axis A2 passes through an entire portion of the pattern polarizer 48, and the linearly polarized light along the third polarizing axis A3 is blocked by the polarizing portions 44. Therefore, the light controller 12 is in a total transmission state in the off-state of the polarizing switch 42, and is in a partial transmission state where the light passes through only the non-polarizing portions 46 in the on-state of the polarizing switch 42.

Figure 5:
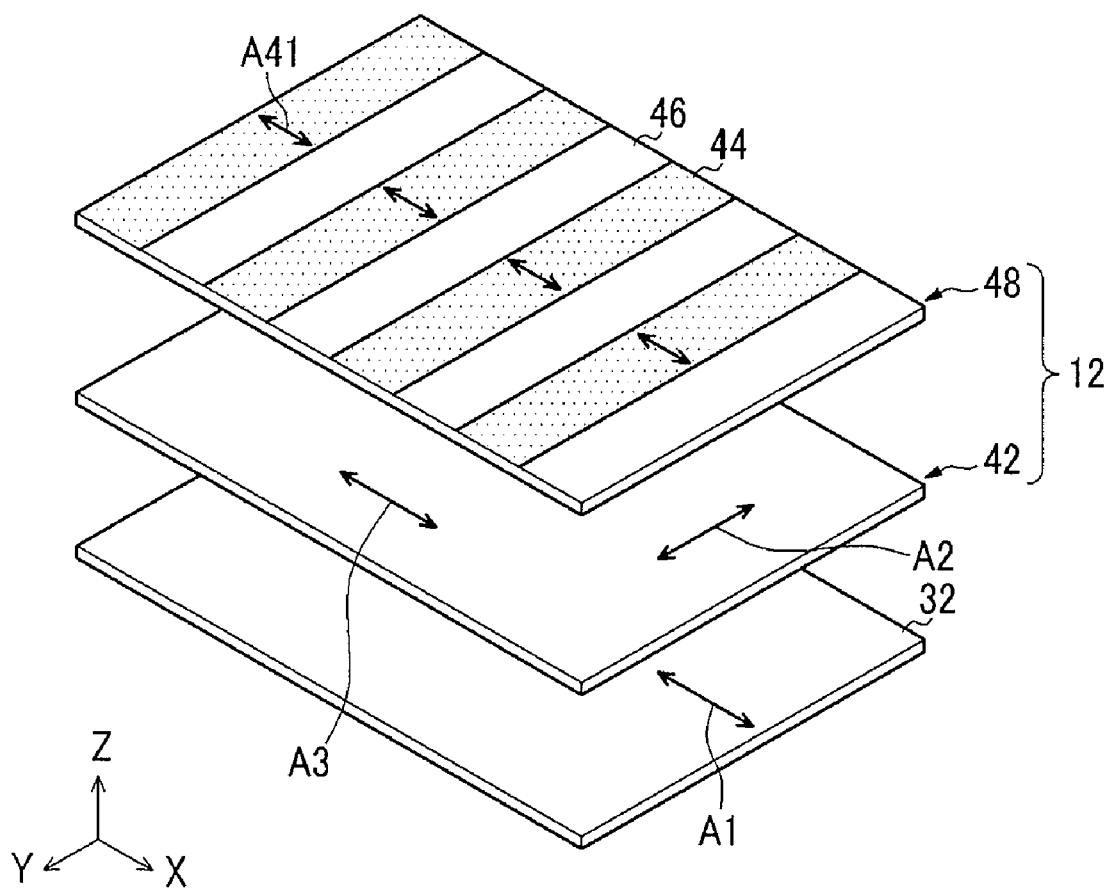

Meanwhile, as shown in FIG. 5, a fourth polarizing axis A41 may be perpendicular to the second polarizing axis A2. In this case, the light that is linearly polarized along the second polarizing axis A2 is blocked by the polarizing portions 44, and the light that is linearly polarized along the third polarizing axis A3 passes through the entire portion of the pattern polarizer 48. Therefore, the light controller 12 is in the partial transmission state in the off-state of the polarizing switch 42, and is in the total transmission state in the on-state of the polarizing switch 42.

When the two dimensional image mode is a main mode, as shown in FIG. 4, the power consumption can be reduced by allowing the light controller 12 to be in the total transmission state in the off-state of the polarizing switch 42. On the contrary, when the stereoscopic image mode is the main mode, as shown in FIG. 5, the power consumption can be reduced by allowing the light controller 12 to be in the partial transmission state in the off-state of the polarizing switch 42.

When the display unit 10 displays the two dimensional image, the light controller 12 is in the total transmission state. When the display unit 10 separately displays the left eye and right eye images by each pixel or each sub-pixel, the light controller 12 is in the partial transmission state to separate the left eye and right eye images from each other.

Figure 6:
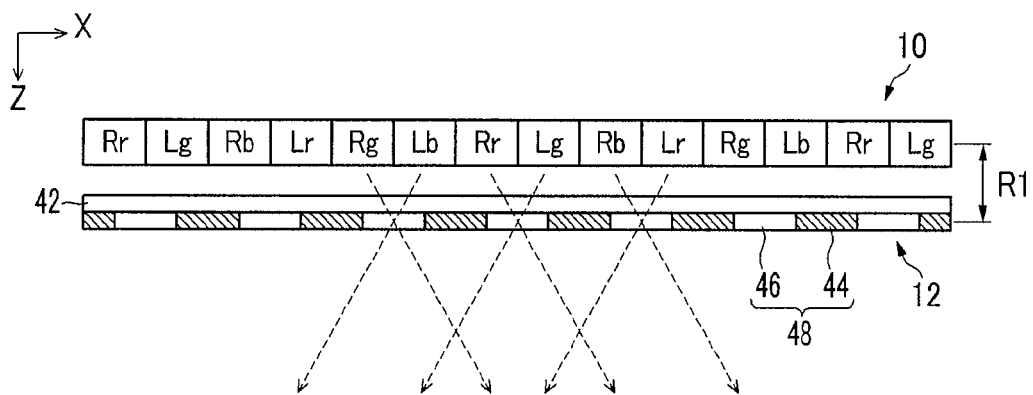
FIGS. 6 and 7 are partial sectional views of a stereoscopic image mode of the electronic display device of FIG. 1.

FIG. 6 is a partial sectional view of the stereoscopic image mode of the electronic display device of FIG. 1.

Referring to FIG. 6, the display unit 10 receives left eye and right eye image signals at each pixel or each sub-pixel and separately displays the left and right images. FIG. 6 shows a case where the left eye and right eye images are separately displayed by each sub-pixel. In FIG. 6, the reference characters Rr, Rg, and Rb respectively represent red, green, and blue sub-pixels that display the right eye image, and the reference characters Lr, Lg, and Lb respectively represent red, green, and blue sub-pixels that display the left eye image.

Through the combination of the polarizing switch 42 and the pattern polarizer 48, regions where the polarizing portions 44 are located are defined as light blocking portions of the light controller 12, and regions where the non-polarizing portions 46 are located are defined as light transmission portions of the light controller 12. The left eye and right eye images disposed on the display unit 10 are separated toward the left and right eyes of the viewer while passing through the light controller 12. Therefore, the viewer perceives the image of the display unit 10 as the stereoscopic image.

As the electronic display device 100 of the present exemplary embodiment uses the first and second common electrodes 38 and 40, the electrode patterning process can be omitted unlike the conventional liquid crystal barrier and thus the manufacturing process can be simplified. Further, since the first and second substrates 50 and 52 can be formed of thin films, a thickness of the electronic display device 100 can be effectively reduced.

Further, since a distance between the image-formation plane of the display unit 10 and the image-separation plane of the light controller 12 is reduced by the reduced thickness of the first substrate 50, the viewing distance is reduced. In FIG. 6, the distance between the image-formation plane and the image-separation plane is indicated by the reference symbol R1. It can be assumed that the image-formation plane is a central portion of the liquid crystal layer 20 of the LCD panel 14 and that the image-separation plane is a central portion of the pattern polarizer 48.

Figure 7:
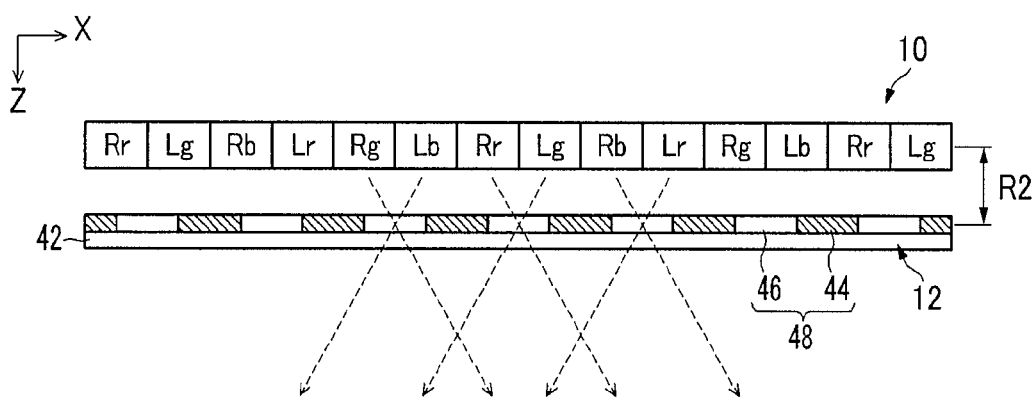

Meanwhile, as shown in FIG. 7, the light controller 12 may be configured such that the pattern polarizer 48 is disposed between the display unit 10 and the polarizing switch 42 by switching the positions of the polarizing switch 42 and the pattern polarizer 48. In this case, the distance between the image-formation plane and the image-separation plane can be further shortened as compared with the structure shown in FIG. 6, thereby more effectively reducing the viewing distance. In FIG. 7, the distance between the image-formation plane and the image-separation plane is indicated by the reference symbol R2. The viewing distance is appropriate for the mobile device.

Figure 8:
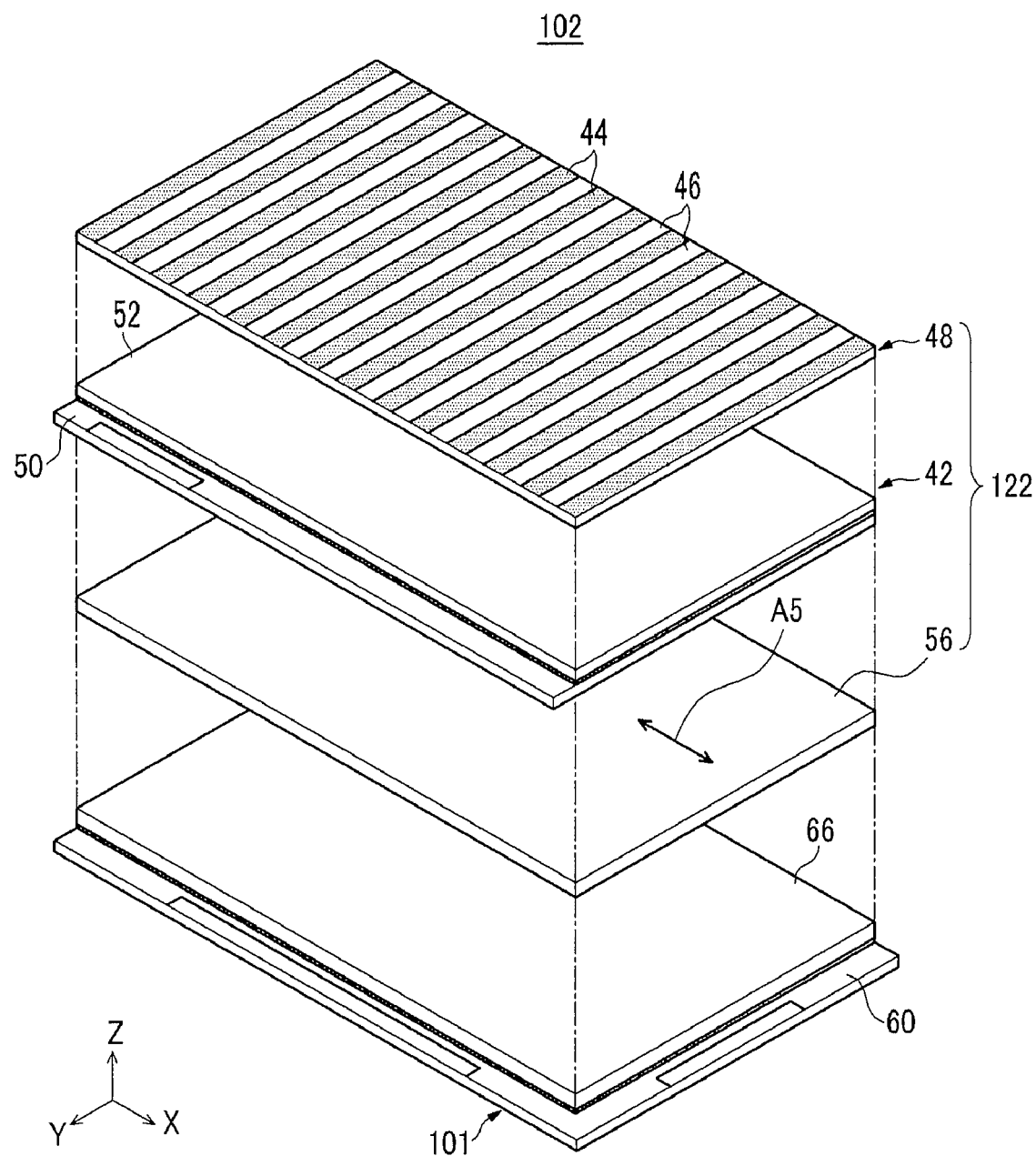
FIG. 8 is an exploded perspective view of an electronic display device according to a second exemplary embodiment of the present invention.

FIG. 8 is an exploded perspective view of an electronic display device according to a second exemplary embodiment of the present invention.

Referring to FIG. 8, an electronic display device 102 of the present exemplary embodiment has a structure that is identical to that of the first exemplary embodiment except that a display unit 101 is configured to display an image without using a polarizing plate, and a light controller 122 further includes a third polarizing plate 56 located in the rear of the polarizing switch 42. Like reference numerals will designate like parts throughout the drawings related to the first and second exemplary embodiments.

The display unit 101 includes one of, but is not limited to an organic light emitting display panel, a cathode ray tube, a plasma display panel, and a field emission display panel, which, unlike the LCD panel, can display an image without using a polarizing plate. In FIG. 8, although the display unit 101 is illustrated as a flat panel type, the present invention is not limited to this case. In order to describe an application example of the display unit 101, FIG. 9 shows a partial sectional view of the organic light emitting display panel.

Figure 9:
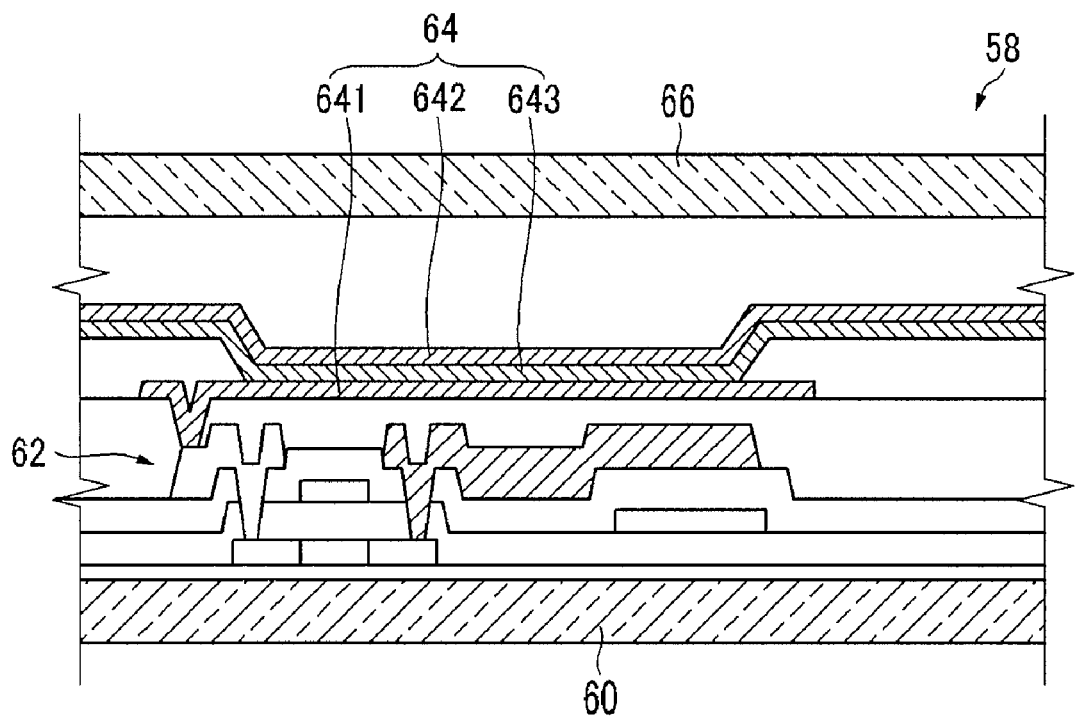
FIG. 9 is a partial sectional view of a display unit of the electronic display device of FIG. 8.

Referring to FIG. 9, an organic light emitting display panel 58 includes a rear substrate 60, at least two thin film transistors 62 provided on the rear substrate 60 for each sub-pixel, an organic light emitting element 64 controlled by the thin film transistors 62, and a front substrate 66 combined with the rear substrate 60 and provided with a moisture absorption agent therein. The organic light emitting element 64 includes an anode electrode 641, a cathode electrode 642, and an organic light emitting layer 643 disposed between the anode electrode 641 and the cathode electrode 642.

When the anode electrode 641 and the cathode electrode 642 inject holes and electrons to the organic light emitting layer 643 respectively, excitons are generated in the organic light emitting layer 643 by the combination of the electrons and the holes. The organic light emitting layer 643 emits light using energy generated when the excitons change from an excited state to a ground state.

Referring again to FIG. 8, the third polarizing plate 56 has a fifth polarizing axis A5 coinciding with one of the horizontal or vertical directions (x or y-directions in the drawing) of the screen. In FIG. 8, a case where the fifth polarizing axis A5 coincides with the horizontal direction of the screen is illustrated by way of example.

As described above, when the display unit 101 is a display device other than the LCD panel, the light controller 122 further includes the third polarizing plate 56 for linearly polarizing the incident light. Therefore, the light controller 122 selectively realizes the two dimensional mode and the three dimensional mode by being in a total transmission state or being in a partial transmission state in accordance with the operation of the third polarizing plate 56, the polarizing switch 42, and the pattern polarizer 48.

In FIG. 8, although the pattern polarizer 48 is disposed in front of the polarizing switch 42, the present invention is not limited to this configuration. That is, the pattern polarizer 48 may be disposed in the rear of the polarizing switch 42. This structure has a feature of reducing the viewing distance.

Figure 10:
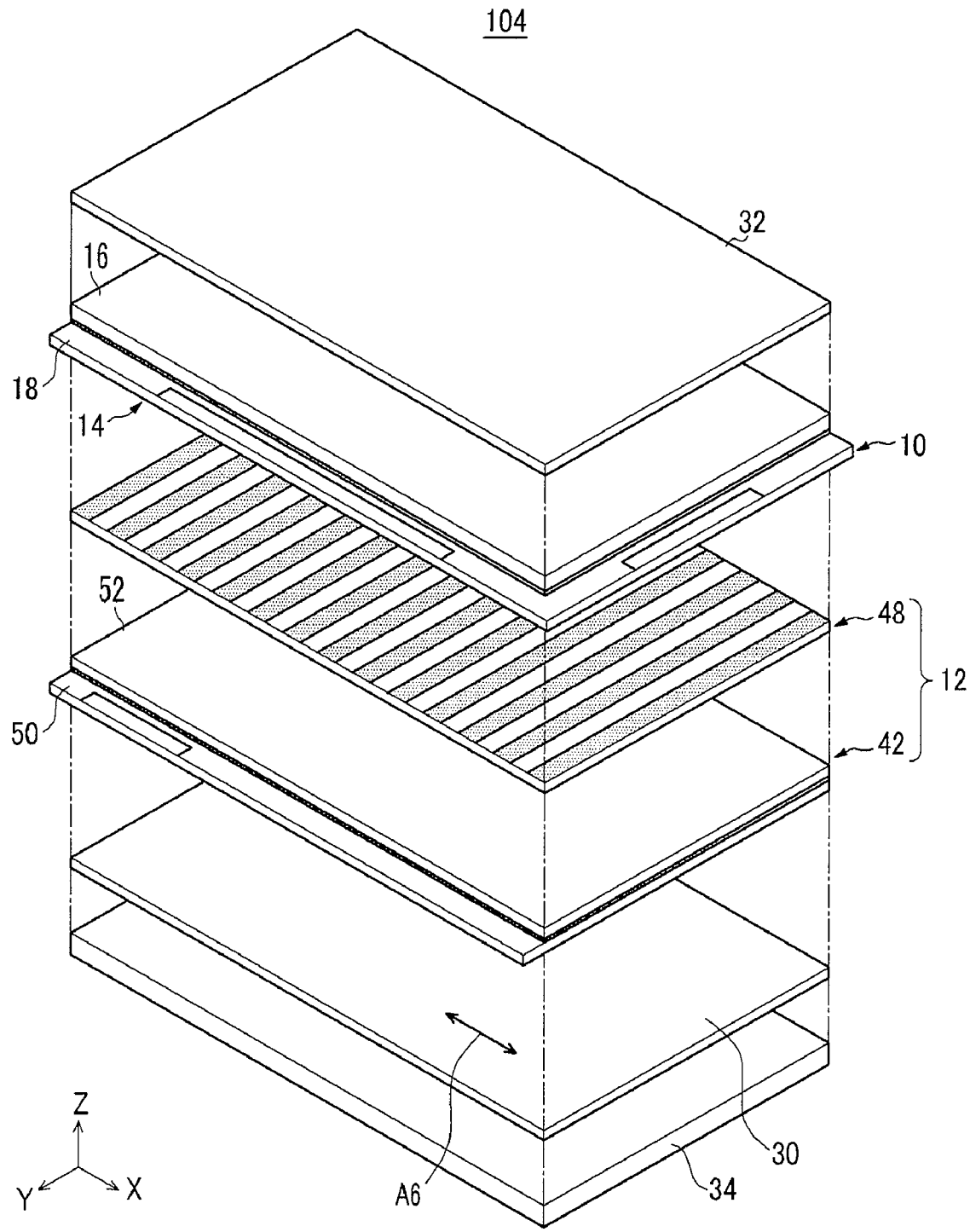
FIG. 10 is an exploded perspective view of an electronic display device according to a third exemplary embodiment of the present invention.

FIG. 10 is an exploded perspective view of an electronic display device according to a third exemplary embodiment of the present invention.

Referring to FIG. 10, an electronic display device 104 of the present exemplary embodiment has a structure that is identical to that of the first exemplary embodiment except that a light controller 12 having a polarizing switch 42 and a pattern polarizer 48 is disposed between a first polarizing plate 30 and a rear substrate 18. Like reference numerals will designate like parts throughout the drawings related to the first and third exemplary embodiments.

Light emitted from a light source 34 is linearly polarized along a polarizing axis (a sixth polarizing axis A6) of the first polarizing plate 30 while passing through the first polarizing plate 30. The linearly polarized light is directed to the light controller 12. In FIG. 10, a case where the sixth polarizing axis A6 coincides with the horizontal direction of the screen is illustrated by way of example.

The light controller 12 transmits all or part of incident light in accordance with operations of the polarizing switch 42 and the pattern polarizer 48 while maintaining the incident light in the linearly polarized state. The light that passed through the light controller 12 is controlled in transmittance at each pixel in accordance with operations of the liquid crystal layer 20 and the second polarizing plate 32.

In the stereoscopic image mode, the light controller 12 is in a partial transmission state and the LCD panel separately displays left eye and right eye images by pixels or sub-pixels. Then, the pixels or sub-pixels applied with left eye image signals receive the light coming through the light controller 12 and traveling toward the left eye of the viewer, and display the left eye image in the direction of the left eye. Further, the pixels or sub-pixels applied with right eye image signals receive the light coming through the light controller 12 and traveling toward the right eye of the viewer, and display the right eye image in the direction of the right eye. Therefore, the viewer stereoscopically perceives the image displayed on the display unit.

Figure 11:
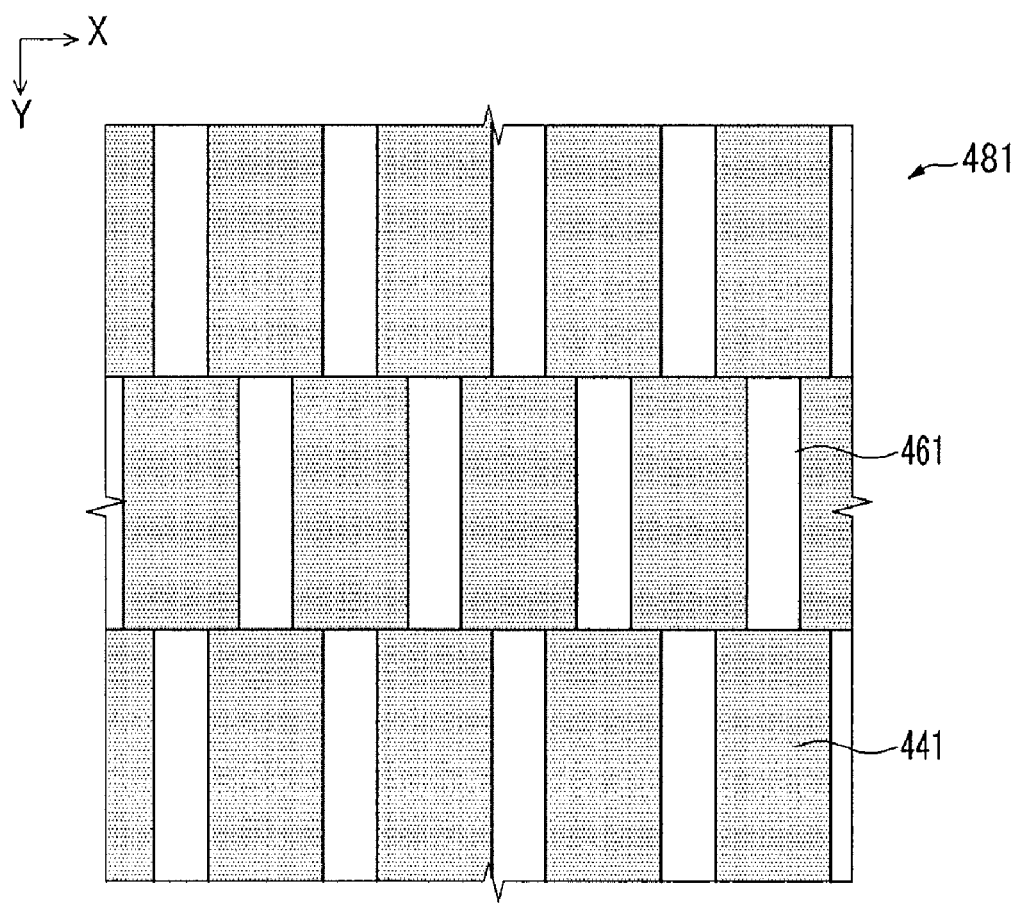
FIG. 11 is a partial top view of a first modified example of a pattern polarizer.

FIG. 11 is a partial top view of a first modified example of the pattern polarizer.

Referring to FIG. 11, a pattern polarizer 481 of this modified example includes a plurality of polarizing portions 441 and a plurality of non-polarizing portions 461 that are alternately arranged in a horizontal direction (an x-direction in the drawing) of the screen. The polarizing and non-polarizing portions 441 and 461 are further arranged in a vertical direction (a y-direction of the drawing) of the screen such that centers thereof are disposed in a zigzag pattern. A width of the polarizing portion 441 may be greater than that of the non-polarizing portion 461 but is not limited thereto. When the light controller is in a partial transmission state in a three dimensional mode, the polarizing portions 441 and the non-polarizing portions 461 respectively form light blocking portions and light transmitting portions.

Figure 12:
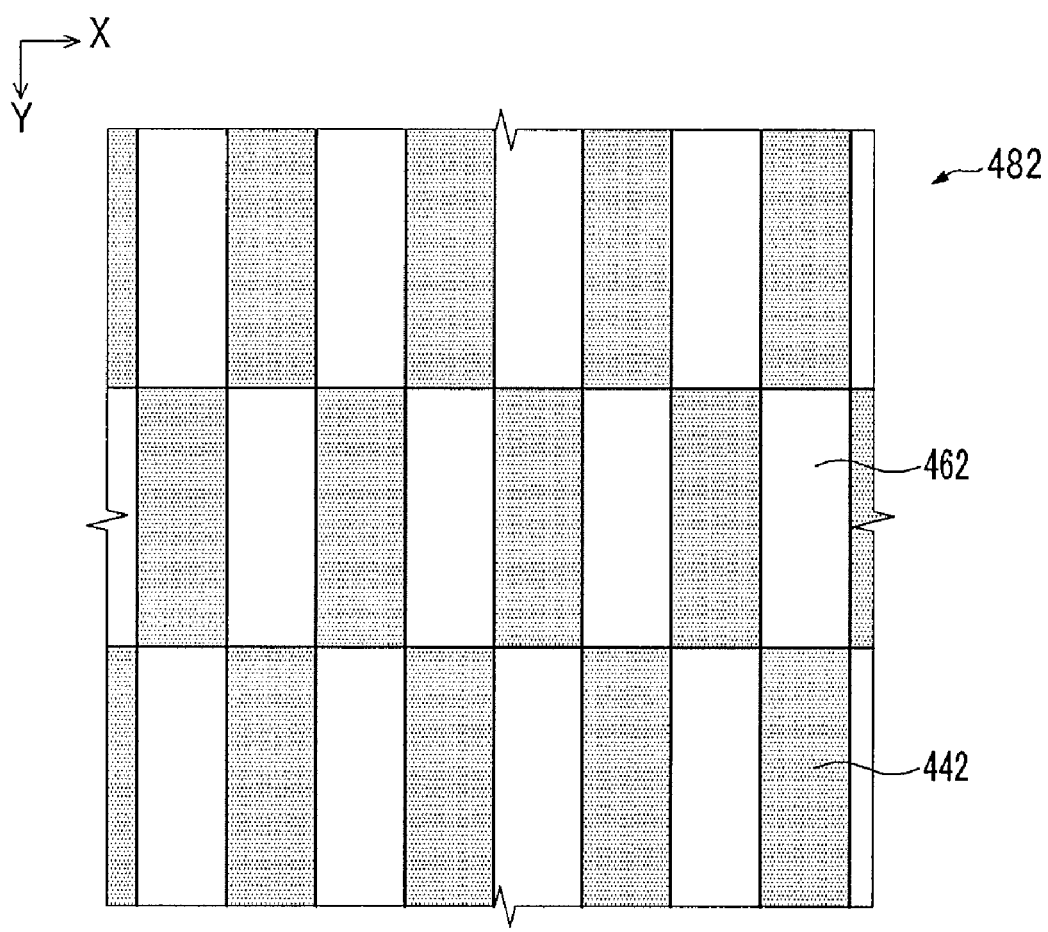
FIG. 12 is a partial top view of a second modified example of a pattern polarizer.

FIG. 12 is a partial top view of a second modified example of the pattern polarizer.

Referring to FIG. 12, a pattern polarizer 482 of this modified example includes a plurality of polarizing portions 442 and a plurality of non-polarizing portions 462 that are alternately arranged in a horizontal direction (an x-direction in the drawing) and a vertical direction (a y-direction in the drawing) of the screen. The polarizing and non-polarizing portions 442 and 462 may be formed with identical widths but are not limited thereto. When the light controller is in a partial transmission state in a three dimensional mode, the polarizing portions 442 and the non-polarizing portions 462 respectively form light blocking portions and light transmitting portions.

The light controller having the pattern polarizer 481 or 482 of the above-described modified examples can realize the stereoscopic image with a horizontal resolution substantially identical to that of a two dimensional planar image when the display unit separately displays left eye and right eye images.

Figure 13:
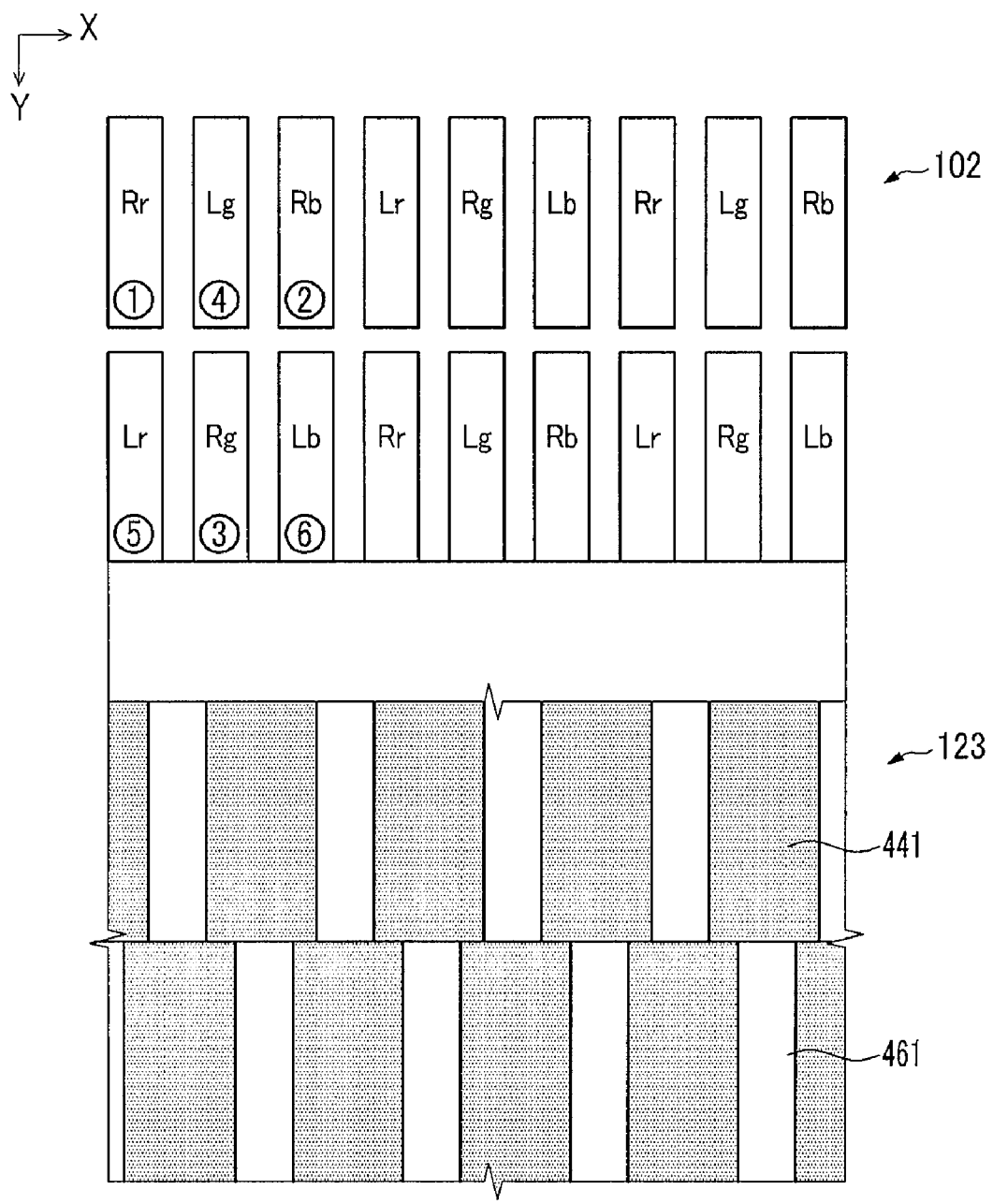
FIG. 13 is a partial top view of a display unit and a light controller of an electronic display device having the pattern polarizer of FIG. 11.

FIG. 13 is a schematic partial top view of the display unit and the light controller of the electronic display device having the pattern polarizer of FIG. 11.

Referring to FIG. 13, the display unit 103 may alternately display the right eye and left eye images at the sub-pixels of the odd-numbered lines and alternately display the left eye and right eye images at the sub-pixels of the even-numbered lines. In FIG. 13, the reference characters Rr, Rg, and Rb indicate the red, green, and blue sub-pixels displaying the right eye image and the reference characters Lr, Lg, and Lb indicate the red, green, and blue sub-pixels displaying the left eye image.

Further, in the light controller 123, the non-polarizing portions 461 are disposed between the sub-pixels for the right eye image and the sub-pixels for the left eye image corresponding to each line of the sub-pixels along a line extending in the horizontal direction (the x-direction in FIG. 13) of the screen.

In the above-described electronic display device, two sub-pixels ① and ② for the right eye image, which are located on the odd-numbered lines, and one sub-pixel ③ for the right eye image, which is located on the even-numbered lines, constitute one pixel for the right eye image. In addition, one sub-pixel ④ for the left eye image, which is located on the odd-numbered line, and two sub-pixels ⑤ and ⑥ for the left eye image, which are located on the even-numbered lines, constitute one pixel for the left eye image.

The electronic display device can realize a stereoscopic image having a horizontal resolution substantially identical to that of a two dimensional planar image by the above-described arrangement of the pixels. Meanwhile, when the light controller 123 has the pattern polarizer of FIG. 12, a similar effect can be obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electronic display device comprising:
a display unit for displaying an image; and
a light controller in front of the display unit and for creating an optically parallax barrier,
wherein the light controller comprises:
a polarizing switch for controlling a polarizing direction using an electrical signal, the polarizing switch comprising first and second substrates and having first and second common electrodes corresponding to entire active areas of the first and second substrates, respectively, and facing each other and a liquid crystal layer between the first and second common electrodes;
a pattern polarizer for controlling light transmission in cooperation with the polarizing switch, the pattern polarizer having a plurality of polarizing portions and a plurality of non-polarizing portions alternately arranged in a first direction, wherein centers of the polarizing portions and the non-polarizing portions are arranged in a zigzag pattern in a second direction substantially perpendicular to the first direction, and wherein at least one of the polarizing portions of the zigzag pattern is wider than at least one of the non-polarizing portions of the zigzag pattern, such that the polarizing portions in two adjacent rows along the second direction partially overlap with each other in the second direction; and
a polarizing plate located between the display unit, and the polarizing switch and the pattern polarizer,
wherein the display unit is selected from the group consisting of an organic light emitting display panel, a cathode ray tube, a plasma display panel, and a field emission display panel.

2. The electronic display device of claim 1, wherein:
the polarizing plate has a first polarizing axis;
the polarizing switch has a second polarizing axis in an off-state and a third polarizing axis in an on-state; and
the polarizing portions of the pattern polarizer have a fourth polarizing axis.

3. The electronic display device of claim 2, wherein the second polarizing axis is substantially perpendicular to the first polarizing axis or substantially coincides with the first polarizing axis.

4. The electronic display device of claim 2, wherein the fourth polarizing axis substantially coincides with the second polarizing axis, and the light controller is in a total transmission state when the polarizing switch is in the off-state.

5. The electronic display device of claim 2, wherein the fourth polarizing axis is substantially perpendicular to the second polarizing axis, and the light controller is in a partial transmission state when the polarizing switch is in the off-state.

6. The electronic display device of claim 1, wherein the polarizing switch is between the display unit and the pattern polarizer.

7. The electronic display device of claim 1, wherein the pattern polarizer is between the display unit and the polarizing switch.

8. An electronic display device comprising:
a display unit for displaying an image; and
a light controller in front of the display unit,
wherein the light controller comprises:
- a polarizing switch for controlling a polarizing direction using an electrical signal, the polarizing switch comprising first and second substrates and having first and second common electrodes corresponding to entire active areas of the first and second substrates, respectively, and facing each other and a liquid crystal layer between the first and second common electrodes; and
- a pattern polarizer for controlling light transmission in cooperation with the polarizing switch, the pattern polarizer having a plurality of polarizing portions and a plurality of non-polarizing portions alternately arranged in a first direction, wherein centers of the polarizing portions and the non-polarizing portions are arranged in a zigzag pattern in a second direction substantially perpendicular to the first direction, and
wherein at least one of the polarizing portions of the zigzag pattern is wider than at least one of the non-polarizing portions of the zigzag pattern, such that the polarizing portions in two adjacent rows along the second direction partially overlap with each other in the second direction.

9. An electronic display device comprising:
a display unit for displaying an image; and
a light controller in front of the display unit and for creating an optically parallax barrier,
wherein the light controller comprises:
- a polarizing switch for controlling a polarizing direction using an electrical signal, the polarizing switch comprising first and second substrates and having first and second common electrodes corresponding to entire active areas of the first and second substrates, respectively, and facing each other and a liquid crystal layer between the first and second common electrodes; and
- a pattern polarizer for controlling light transmission in cooperation with the polarizing switch, the pattern polarizer having a plurality of polarizing portions and a plurality of non-polarizing portions alternately arranged in a first direction, wherein centers of the polarizing portions and the non-polarizing portions are arranged in a zigzag pattern in a second direction substantially perpendicular to the first direction, and wherein at least one of the polarizing portions of the zigzag pattern is wider than at least one of the non-polarizing portions of the zigzag pattern, such that the polarizing portions in two adjacent rows along the second direction partially overlap with each other in the second direction.

* * * * *